3,505,156
Patented Apr. 7, 1970

3,505,156
PROCESS OF APPLYING POLYMERIC LATICES TO A TEXTILE ARTICLE AND THE RESULTING ARTICLE
John Alfred Handscomb, Knebworth, and Barry Charles Hibbin, Welwyn Garden City, England, assignors to Imperial Chemical Industries Limited, London, England, a corporation of Great Britain
No Drawing. Filed Oct. 28, 1966, Ser. No. 590,183
Claims priority, application Great Britain, Nov. 15, 1965, 48,324/66
Int. Cl. D03d 27/12; C09d 3/74, 3/76
U.S. Cl. 161—67                                                10 Claims

ABSTRACT OF THE DISCLOSURE

A method of backing or impregnating a textile article which comprises applying to the article a copolymer containing from 30 to 50% by weight of butadiene-1,3 units and at least half of the remainder styrene and/or methyl methacrylate units, any other constituent of the copolymer being derived from another monoethylenically unsaturated compound, in the form of a stable dispersion containing from 0.5 to 10% by weight based on the weight of said butadiene-1,3 copolymer of a copolymer of styrene and any of maleic anhydride, the alkyl half esters of maleic acid containing up to eight carbon atoms in the alkyl group and the half amides of maleic acid in the form of a solution in an inorganic or organic base, and thereafter drying the treated article.

---

The present invention relates to the application of polymeric latices to textile articles and particularly to their use as backings or impregnants for textile articles particularly tufted and woven carpets, and furnishing fabrics.

The use of butadiene copolymer latices as backings or impregnants for textile articles is well known. For some applications it is necessary to cure the copolymer by including known curing agents in the composition, e.g. sulphur and zinc oxide together with accelerators for the curing process. In the manufacture of tufted and woven carpets it is desirable where a copolymer latex is applied as the backing material for the carpet, that this should be capable of being applied without using conventional curing agents in as simple a manner as possible.

An object of this invention is to provide a process by which textile articles can be backed or impregnated with butadiene copolymer latices without the use of conventional curing agents.

According to the present invention we provide a method of backing or impregnating a textile article which comprises applying to the article a copolymer containing from 30 to 50% by weight of butadiene-1,3 units and at least half of the remainder styrene and/or methyl methacrylate units, any other constituent of the copolymer being derived from another monoethylenically unsaturated compound, in the form of a stable dispersion containing from 0.5 to 10% by weight based on the weight of said butadiene-1,3 copolymer of a copolymer of styrene and any of maleic anhydride, the alkyl half esters of maleic acid containing up to eight carbon atoms in the alkyl group and the half amides of maleic acid in the form of a solution in an inorganic or organic base, and thereafter drying the treated article.

The butadiene-1,3 copolymers can be binary copolymers made from butadiene-1,3 and styrene or butadiene-1,3 and methyl methacrylate as the essential comonomers, and such copolymers have extremely good binding properties particularly when used as backings for carpets. However, other monoethylenically unsaturated monomers can be copolymerised with the butadiene-1,3 and styrene and/or methyl methacrylate, e.g. acrylonitrile, methacrylonitrile, methacrylic acid and ethyl acrylate. There is little advantage to be gained by using more complicated copolymers and we prefer therefore to use as copolymers those containing from 55 to 65% by weight based on the weight of the copolymer or styrene and/or methyl methacrylate units and the remainder butadiene-1,3 units because these have the required binding properties. It may, however, be an advantage for the copolymer to have a small proportion, e.g. from 0.05% to 13.5% by weight based on the weight of the copolymer of carboxyl groups expressed as —COOH. These may be introduced by including a copolymerisable monomer containing one or more carboxyl groups, e.g. acrylic or itaconic acid as one of the monomer components of the mixture for making the butadiene-1,3 copolymer. Such carboxyl containing monomers may be included in any of the copolymers hereinbefore described as a partial replacement of the styrene or methyl methacrylate, or present as an additional monoethylenically unsaturated monomer in an amount sufficient to give the required carboxyl content. The copolymers used in the method of the invention can be prepared by well known polymerisation processes and are most conveniently prepared by the emulsion polymerisation process in which the monomers to be polymerised are dispersed in an aqueous phase containing an emulsifying agent and there polymerised in the presence of a catalyst to form a stable copolymer dispersion.

The copolymers of styrene and maleic anhydride or half esters or amides can also be prepared by well known methods. It is preferred to use copolymers derived from 0.5 to 2 molecular proportions of maleic anhydride, the alkyl half ester of maleic acid containing up to eight carbon atoms in the alkyl group or the half amide of maleic acid, to each molecular proportion of styrene because such copolymers have good solubility in alkalis to form solutions that have good compatibility with the butadiene-1,3 copolymer dispersion. The copolymers may be formed by mass or solvent polymerisation, in which case the copolymer is obtained as a solid. The solid copolymer can be dissolved in an inorganic or organic base and the solution added to the butadiene-1,3 copolymer dispersion to give the desired curing properties. No useful effect is obtained when less than 0.5% by weight is used based on the weight of the butadiene-1,3 copolymer, and in general the most useful results are obtained when from 2 to 5% by weight are used. These copolymers are used in the form of solutions in an inorganic or organic base, e.g. in ammonia, sodium or potassium hydroxide, triethanolamine, or morpholine. The solutions can be quite easily prepared by first forming a slurry of the copolymer with water and then adding sufficient alkali to dissolve the copolymer.

The copolymer dispersion hereinbefore defined can be applied as a backing to tufted or woven carpets or other textile articles in a similar manner to that used for natural rubber latex except that no conventional curing agents, e.g. sulphur, need be included in the backing composition. Thus, the process has the particular merit that it is carried out in the absence of conventional curing agents, i.e. sulphur and sulphur-containing compounds known in the rubber art as curing or vulcanising agents. The carpet manufacturer, consequently, merely has to prepare the coating composition in the manner described herein, apply it to the back of the carpet and dry off the backing. Since the carpet manufacturer will not be a copolymer manufacturer, he can be supplied with a copolymer latex as hereinbefore described, and the subsequent operations then become very much simpler as compared with the situation where the backing material has to be cured with a conventional curing agent, e.g. sulphur. The backing compositions will often, but not necessarily always, include such conventional ingredients as a finely divided filler, a dispersing agent for the filler, and a thickening agent.

The amounts of fillers used may vary in amount up to 10 parts by weight to one part by weight of total copolymer. Examples include whiting, crushed limestone, and china clay. Small proportions of pigments, e.g. titanium dioxide, lithopone or carbon black may be added for special effects. A dispersing agent, e.g. sodium hexametaphosphate, is normally required to disperse the filler, in an amount of, e.g. 0.1 to 0.5% by weight based on the dry weight of filler (and pigment where this is present). Suitable thickening agents include sodium polyacrylate, cellulosic derivatives and ammonium polymethacrylate.

The copolymer dispersion is conventional prepared in a vessel equipped with a stirrer by adding first the required amount of water, followed in turn by the dispersing agent, the filler (if present), the copolymer latex, and finally the thickening agent. When a well dispersed composition has been obtained this is transferred to the trough of the coating machine, and the composition applied by known means, for example a lick roller/doctor blade system, as a backing to the carpet.

For the best results for tufted carpeting it is preferred to apply a coating weight of 600–700 g. dry weight per $m.^2$, followed by drying at from 120 to 150° C. for 5 to 15 minutes. The stiffness of the backed carpet can be increased by increasing the drying temperature.

If desired a second layer of hessian can be applied over the backing while still wet, or bonded with an adhesive after the backing has dried to give what is known in the carpet industry as "secondary backed carpet." In this case a slightly heavier coating weight of backing may be preferred. If desired a foamed backing can be applied to the backed carpet.

In the carpet trade a desirable feature of a carpet that is referred to is the possession of the carpet of "substantial handle." A measure of this feature is the combination of flexibility and stiffness as opposed to limpness and floppiness of the carpet. The stiffness of the final article can be controlled by varying the time and temperature of drying, and the amounts of the copolymer of styrene and maleic anhydride, the alkyl half esters of maleic acid and the half amides of maleic acid. In general stiffness can be increased by increasing the amount of the styrene copolymer. With a particular concentration of the styrene copolymer stiffness can also be increased by increasing the temperature at which the article is dried. A useful advantage of our method is that while articles of the required degree of stiffness can be obtained, the backing still retains its flexibility as is evidenced by freedom from cracking of the backing when the article is bent or folded. It is to be understood that by "stiffness" is meant the normal degree of stiffness that is found in conventional carpets and other textile articles.

Our invention is illustrated by the following example in which all parts are expressed by weight.

The copolymer latex was prepared by first taking a latex of a copolymer of butadiene-1,3 and methyl methacrylate containing 38% of butadiene-1,3 units and 62% of methyl methacrylate units, the latex containing 50% by weight of copolymer.

To this latex was added an alkaline solution of a copolymer of styrene and maleic anhydride containing 50 mole percent of styrene and 50 mole percent of maleic anhydride. This solution was prepared by first forming a slurry of the copolymer in water containing 0.5% by weight of "Teepol" 610 (a wetting agent, believed to be a secondary alkyl sulphate) based on the weight of the water, and then adding sufficient morpholine to dissolve the copolymer. A solution containing 12.5% by weight of the styrene/maleic anhydride copolymer based on the weight of the solution was added to the butadiene/methyl methacrylate copolymer latex in the proportion 24 parts of solution to 200 parts of latex.

The backing composition was then prepared as follows. To a stirred mixing vessel there were added the following ingredients in the order set out:

| | Parts |
|---|---|
| Water | 373 |
| Sodium hexametaphosphate (dispersing agent) | 1.9 |
| Whiting | 1000 |
| Copolymer latex (as prepared above) | 666 |
| Sodium polyacrylate (thickening agent) | 26.8 |

When all the ingredients had been added, stirring was continued until the ingredients were well dispersed. The mixture was then transferred to a coating machine which was of the lick roller/doctor knife kind.

The coating was then applied as a backing to the reverse side of a tufted carpet by means of the conventional lick roller/doctor knife system. The coating was applied at 650 g./$m.^2$ and dried at 130° C. for 10 minutes.

In the backed carpet, the tufts were found to be very firmly anchored by the backing, and using the Instron Tensile Tester with the jaws separating at 25.4 cm. per minute the pull required to remove a tuft from the backing was 1.8 to 3.2 kg. By comparison a carpet backed in the same manner with a backing that was identical except that it contained no copolymer of styrene and maleic anhydride gave lower results when tested by the Instron Tester in the range 0.9 to 1.8 kg.

We claim:

1. A method of backing or impregnating a textile article which comprises applying to the article a stable dispersion of a copolymer containing from 30 to 50% by weight of butadiene-1,3 units and at least half of the remainder selected from the group consisting of styrene and methyl methacrylate units, any other constituent of the copolymer being derived from another monoethylenically unsaturated compound, said stable dispersion also containing from 0.5 to 10% by weight based on the weight of said butadiene-1,3 copolymer of a copolymer of styrene and a member of the group consisting of maleic anhydride, the alkyl half esters of maleic acid containing up to eight carbon atoms in the alkyl group and the half amides of maleic acid in the form of a solution in an inorganic or organic base, and thereafter drying the treated article at a temperature of at least 120° C.

2. A method according to claim 1 in which said butadiene-1,3 copolymer is a binary copolymer of butadiene-1,3 and styrene or methyl methacrylate.

3. A method according to claim 1 in which said butadiene-1,3 copolymer contains from 55 to 65% by weight based on the weight of the copolymer of styrene or methyl methacrylate units and the remainder butadiene-1,3 units.

4. A method according to claim 1 in which the butadiene-1,3 copolymer contains from 0.05% to 13.5% by weight of carboxyl groups expressed as —COOH.

5. A method according to claim 1 in which the copolymer of styrene and maleic anhydride or half ester or half amide of maleic acid is derived from a mixture of 0.5 to 2 molecular proportions of maleic anhydride or half ester or half amide of maleic acid to each molecular proportion of styrene.

6. A method according to claim 1 in which there is used from 2 to 5% by weight of said copolymer of styrene and maleic anhydride or the half ester or half amide of maleic acid, based on the weight of the butadiene-1,3 copolymer.

7. A method according to claim 1 in which the stable dispersion of copolymer contains dispersed therein a finely divided filler in an amount up to 10 parts by weight of the filler to one part by weight of total copolymer.

8. A method according to claim 1 in which the copolymer dispersion is applied as a backing to a tufted carpet and the backing is thereafter dried at a temperature of from 120 to 150° C. for from 5 to 15 minutes.

9. A method according to claim 8 in which the copolymer dispersion is applied to give a dry coating weight of 600–700 g./m².

10. Tufted carpets comprising a carpeting fabric coated with a composition which comprises a copolymer containing from 30 to 50% by weight of butadiene-1,3 units and at least half of the remainder selected from the group consisting of styrene and methyl methacrylate units, any other constituent of the copolymer being derived from another monoethylenically unsaturated compound, and from 0.5 to 10% by weight based on the weight of said butadiene-1,3 copolymer of a copolymer of styrene and a member of the group consisting of maleic anhydride, the alkyl half esters of maleic acid containing up to 8 carbon atoms in the alkyl group and the half amides of maleic acid.

References Cited

UNITED STATES PATENTS

| | | | |
|---|---|---|---|
| 2,637,095 | 5/1953 | Mersereau | 117—161 X |
| 3,256,234 | 6/1966 | Miller | 260—29.7 |
| 3,324,067 | 6/1967 | Donaldson et al. | 117—163 X |
| 3,385,728 | 5/1968 | Walsh | 117—161 |

WILLIAM D. MARTIN, Primary Examiner

T. G. DAVIS, Assistant Examiner

U.S. Cl. X.R.

117—139.5, 161